US008973484B2

(12) United States Patent
Scharp

(10) Patent No.: US 8,973,484 B2
(45) Date of Patent: Mar. 10, 2015

(54) PISTON WITH COOLING GALLERY

(75) Inventor: Rainer Scharp, Vaihingen (DE)

(73) Assignee: MAHLE Industries Inc., Farmington Hills, MI (US)

( * ) Notice: Subject to any disclaimer, the term of this patent is extended or adjusted under 35 U.S.C. 154(b) by 863 days.

(21) Appl. No.: 13/174,943

(22) Filed: Jul. 1, 2011

(65) Prior Publication Data

US 2013/0000483 A1 Jan. 3, 2013

(51) Int. Cl.

| | |
|---|---|
| ***F01B 31/08*** | (2006.01) |
| ***F16J 1/04*** | (2006.01) |
| ***F02F 3/22*** | (2006.01) |
| ***F02F 3/00*** | (2006.01) |

(52) U.S. Cl.

CPC .. *F02F 3/22* (2013.01); *F02F 3/003* (2013.01)
USPC ............................................ 92/186; 92/231

(58) Field of Classification Search

USPC .................................... 92/176, 186, 208, 231
See application file for complete search history.

(56) References Cited

U.S. PATENT DOCUMENTS

| | | | | |
|---|---|---|---|---|
| 908,570 | A | | 1/1909 | Howe |
| 2,539,903 | A | | 1/1951 | Gruetjen |
| 2,569,103 | A | | 9/1951 | Huber |
| 3,189,010 | A | | 6/1965 | Isley |
| 3,596,571 | A | | 8/1971 | Hill et al. |
| 3,613,521 | A | * | 10/1971 | Itano .............................. 92/186 |
| 3,628,511 | A | | 12/1971 | Fischer |
| 3,807,014 | A | | 4/1974 | Hummel |
| 4,010,718 | A | | 3/1977 | Stewart |
| 4,095,513 | A | | 6/1978 | Block |
| 4,360,956 | A | | 11/1982 | Hiller |
| 4,377,967 | A | | 3/1983 | Pelizzoni |
| 4,517,930 | A | | 5/1985 | Nakano et al. |
| 4,532,686 | A | | 8/1985 | Berchem |
| 4,553,472 | A | | 11/1985 | Munro et al. |
| 4,581,983 | A | | 4/1986 | Moebus |
| 4,651,631 | A | | 3/1987 | Avezou |
| 4,658,110 | A | | 4/1987 | Miller et al. |
| 4,838,149 | A | | 6/1989 | Donnison et al. |
| 4,870,733 | A | | 10/1989 | Kawabata et al. |
| 4,986,167 | A | | 1/1991 | Stratton et al. |

(Continued)

FOREIGN PATENT DOCUMENTS

| | | | |
|---|---|---|---|
| CN | 1533860 | A | 10/2004 |
| CN | 1323796 | C | 7/2007 |

(Continued)

OTHER PUBLICATIONS

Final OA dated Apr. 15, 2013; U.S. Appl. No. 12/898,300, filed Oct. 5, 2010; Publication No. US-2011/0197845 A1, published Aug. 18, 2011.

(Continued)

*Primary Examiner* — Michael Leslie
(74) *Attorney, Agent, or Firm* — Rader, Fishman PLCC

(57) ABSTRACT

An exemplary piston assembly and method of making the same are disclosed. An exemplary piston assembly may include a piston crown and skirt. The crown may include radially inner and outer crown mating surfaces, and the crown may define at least in part a cooling gallery extending about a periphery of the crown. The skirt may further include an inner collar wall disposed radially inwardly of a radially inner interface region and extending upwards to a free end. The collar wall may generally enclose the radially inner interface region from the central region.

22 Claims, 6 Drawing Sheets

(56) References Cited

U.S. PATENT DOCUMENTS

| | | | |
|---|---|---|---|
| 5,081,968 | A | 1/1992 | Bruni |
| 5,309,818 | A | 5/1994 | Mendes et al. |
| 5,394,788 | A | 3/1995 | Mendes et al. |
| 5,650,077 | A | 7/1997 | Zinke |
| 5,934,174 | A | 8/1999 | Abraham, Sr. et al. |
| 6,026,777 | A | 2/2000 | Kemnitz et al. |
| 6,112,642 | A | 9/2000 | Jarrett et al. |
| 6,155,157 | A | 12/2000 | Jarrett |
| 6,223,701 | B1 | 5/2001 | Kruse |
| 6,260,472 | B1 | 7/2001 | Zhu et al. |
| 6,279,455 | B1 | 8/2001 | Kruse |
| 6,286,414 | B1 | 9/2001 | Kruse |
| 6,327,962 | B1 | 12/2001 | Kruse |
| 6,491,013 | B1 | 12/2002 | Gaiser et al. |
| 6,526,871 | B1 | 3/2003 | Zhu et al. |
| 6,530,149 | B2 | 3/2003 | Sugiura et al. |
| 6,557,514 | B1 | 5/2003 | Gaiser |
| 6,588,320 | B2 | 7/2003 | Gaiser et al. |
| 6,862,976 | B2 | 3/2005 | Gaiser et al. |
| 6,892,690 | B2 | 5/2005 | Gabriel et al. |
| 6,910,455 | B2 | 6/2005 | Sczepanski et al. |
| 6,990,890 | B2 | 1/2006 | Zhu et al. |
| 7,143,685 | B2 | 12/2006 | Zhu et al. |
| 7,302,927 | B1 * | 12/2007 | Scharp ............................ 92/256 |
| 7,578,229 | B2 | 8/2009 | Dye |
| 7,584,694 | B2 | 9/2009 | Scharp |
| 8,011,288 | B2 * | 9/2011 | Gniesmer et al. ............... 92/231 |
| 8,201,537 | B2 * | 6/2012 | Scharp ....................... 123/193.6 |
| 2002/0189442 | A1 | 12/2002 | Zhu et al. |
| 2003/0037671 | A1 | 2/2003 | Zhu et al. |
| 2004/0149739 | A1 | 8/2004 | Ribeiro et al. |
| 2004/0177503 | A1 | 9/2004 | Bing et al. |
| 2004/0177505 | A1 | 9/2004 | Bing et al. |
| 2006/0027424 | A1 | 2/2006 | Jahkonen |
| 2006/0207424 | A1 | 9/2006 | Gaiser |
| 2007/0048156 | A1 | 3/2007 | Chung et al. |
| 2007/0079775 | A1 | 4/2007 | Lin et al. |
| 2007/0283917 | A1 | 12/2007 | Lapp et al. |
| 2007/0295299 | A1 | 12/2007 | Lapp et al. |
| 2008/0041333 | A1 | 2/2008 | Jarrett et al. |
| 2008/0209725 | A1 | 9/2008 | Sander |
| 2008/0229923 | A1 | 9/2008 | Gniesmer et al. |
| 2008/0250640 | A1 | 10/2008 | Reichstein et al. |
| 2009/0002007 | A1 | 1/2009 | Schubring et al. |
| 2009/0151555 | A1 | 6/2009 | Lapp et al. |
| 2009/0158925 | A1 | 6/2009 | Scharp |
| 2009/0241769 | A1 | 10/2009 | Feeser |
| 2010/0010527 | A1 | 1/2010 | Chen |
| 2010/0108001 | A1 | 5/2010 | Scharp et al. |
| 2010/0218673 | A1 * | 9/2010 | Ribeiro ....................... 92/181 R |
| 2010/0275861 | A1 | 11/2010 | Schneider |
| 2010/0275873 | A1 | 11/2010 | Gniesmer et al. |
| 2010/0299922 | A1 | 12/2010 | Gniesmer et al. |
| 2010/0301567 | A1 | 12/2010 | Schmitt |
| 2010/0307445 | A1 | 12/2010 | Kortas et al. |
| 2011/0030645 | A1 | 2/2011 | Rebello et al. |
| 2011/0107997 | A1 | 5/2011 | Muscas et al. |
| 2011/0119914 | A1 | 5/2011 | Janssen et al. |
| 2011/0126702 | A1 | 6/2011 | Malm et al. |
| 2011/0167632 | A1 | 7/2011 | Fedyna et al. |
| 2011/0197845 | A1 | 8/2011 | Flowers et al. |
| 2011/0265326 | A1 | 11/2011 | Lin et al. |
| 2012/0000439 | A1 | 1/2012 | Scharp et al. |
| 2012/0037112 | A1 | 2/2012 | Muscas |
| 2012/0080004 | A1 | 4/2012 | Menezes et al. |

FOREIGN PATENT DOCUMENTS

| | | | |
|---|---|---|---|
| CN | 101468426 | A | 7/2009 |
| DE | 1024512 | B | 2/1958 |
| DE | 2537182 | A1 | 3/1977 |
| DE | 2717084 | A1 | 10/1978 |
| DE | 2730120 | A1 | 1/1979 |
| DE | 142372 | | 6/1980 |
| DE | 2919638 | A1 | 11/1980 |
| DE | 3032671 | A1 | 3/1982 |
| DE | 3523910 | A1 | 1/1986 |
| DE | 3719703 | A1 | 12/1988 |
| DE | 3832022 | C1 | 9/1989 |
| DE | 4134528 | A1 | 5/1992 |
| DE | 4129746 | A1 | 4/1993 |
| DE | 29905633 | U1 | 8/2000 |
| DE | 10042207 | A1 | 3/2002 |
| DE | 10128737 | A1 | 1/2003 |
| DE | 10145589 | A1 | 4/2003 |
| DE | 102004038464 | A1 | 2/2006 |
| DE | 102004061778 | A1 | 4/2006 |
| DE | 102010025508 | A1 | 12/2011 |
| EP | 0019323 | A1 | 11/1980 |
| EP | 0464626 | A1 | 1/1992 |
| EP | 0787898 | A1 | 8/1997 |
| EP | 0877160 | A1 | 11/1998 |
| EP | 1084793 | A1 | 3/2001 |
| EP | 1611975 | A1 | 1/2006 |
| EP | 1614885 | A2 | 1/2006 |
| EP | 1878902 | A2 | 1/2008 |
| EP | 2096290 | A1 | 9/2009 |
| FR | 2668090 | A1 | 4/1992 |
| GB | 1092720 | A | 11/1967 |
| GB | 1111225 | A | 4/1968 |
| GB | 1265820 | A | 3/1972 |
| GB | 1501387 | A | 2/1978 |
| GB | 2035448 | A | 6/1980 |
| GB | 2431218 | A | 4/2007 |
| JP | 60166158 | U | 11/1985 |
| JP | 1178756 | A | 7/1989 |
| SU | 1518562 | A1 | 10/1989 |
| WO | WO-8302300 | A1 | 7/1983 |
| WO | WO-0220971 | A1 | 3/2002 |
| WO | WO-2006060987 | A1 | 6/2006 |
| WO | WO-2007/082564 | A1 | 7/2007 |
| WO | WO-2009106200 | A1 | 9/2009 |
| WO | WO-2010009779 | A1 | 1/2010 |
| WO | WO-2010/075959 | A1 | 7/2010 |

OTHER PUBLICATIONS

Final OA dated Jun. 6, 2013; U.S. Appl. No. 12/898,251, filed Oct. 5, 2010; Publication No. US-2012/0080004 A1, published Apr. 5, 2012.

Non-Final OA dated Nov. 2, 2012; U.S. Appl. No. 12/898,300, filed Oct. 5, 2010; Publication No. US-2011-0197845-A1, Published Aug. 18, 2011.

Non-Final OA dated Nov. 26, 2012; U.S. Appl. No. 12/898,251, filed Oct. 5, 2010; Publication No. US-2012-0080004-A1, Published Apr. 5, 2012.

* cited by examiner

PISTON WITH COOLING GALLERY

BACKGROUND

A power cylinder assembly of an internal combustion engine generally comprises a reciprocating piston disposed within a cylindrical cavity of an engine block. One end of the cylindrical cavity may be closed while another end of the cylindrical cavity may be open. The closed end of the cylindrical cavity and an upper portion or crown of the piston defines a combustion chamber. The open end of the cylindrical cavity permits oscillatory movement of a connecting rod, which joins a lower portion of the piston to a crankshaft, which is partially submersed in an oil sump. The crankshaft converts linear motion of the piston (resulting from combustion of fuel in the combustion chamber) into rotational motion.

Engines, and in particular the pistons, are under increased stress as a result of constant efforts to increase overall efficiency, e.g., by reducing piston weight and/or increasing pressures and temperatures associated with engine operation. Piston cooling is therefore increasingly important for withstanding the increased stress of such operational conditions over the life of the engine. To reduce the operating temperatures of piston components, a cooling gallery may be provided about a perimeter of the piston, into which crankcase oil may be introduced to reduce the operating temperature of the piston.

Known piston designs having peripheral cooling galleries typically also have centrally disposed galleries and allow for coolant fluid communication directly between the peripheral and central galleries. Such central galleries may be complex or expensive to form in the piston components.

Accordingly, there is a need for a robust, lightweight piston design that reduces frictional losses associated with movement of the piston within the engine bore and also allows adequate cooling, such as by providing a cooling gallery, while simplifying construction of the piston.

BRIEF DESCRIPTION OF THE DRAWINGS

While the claims are not limited to the illustrated examples, an appreciation of various aspects is best gained through a discussion of various examples thereof. Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

Figure 1:
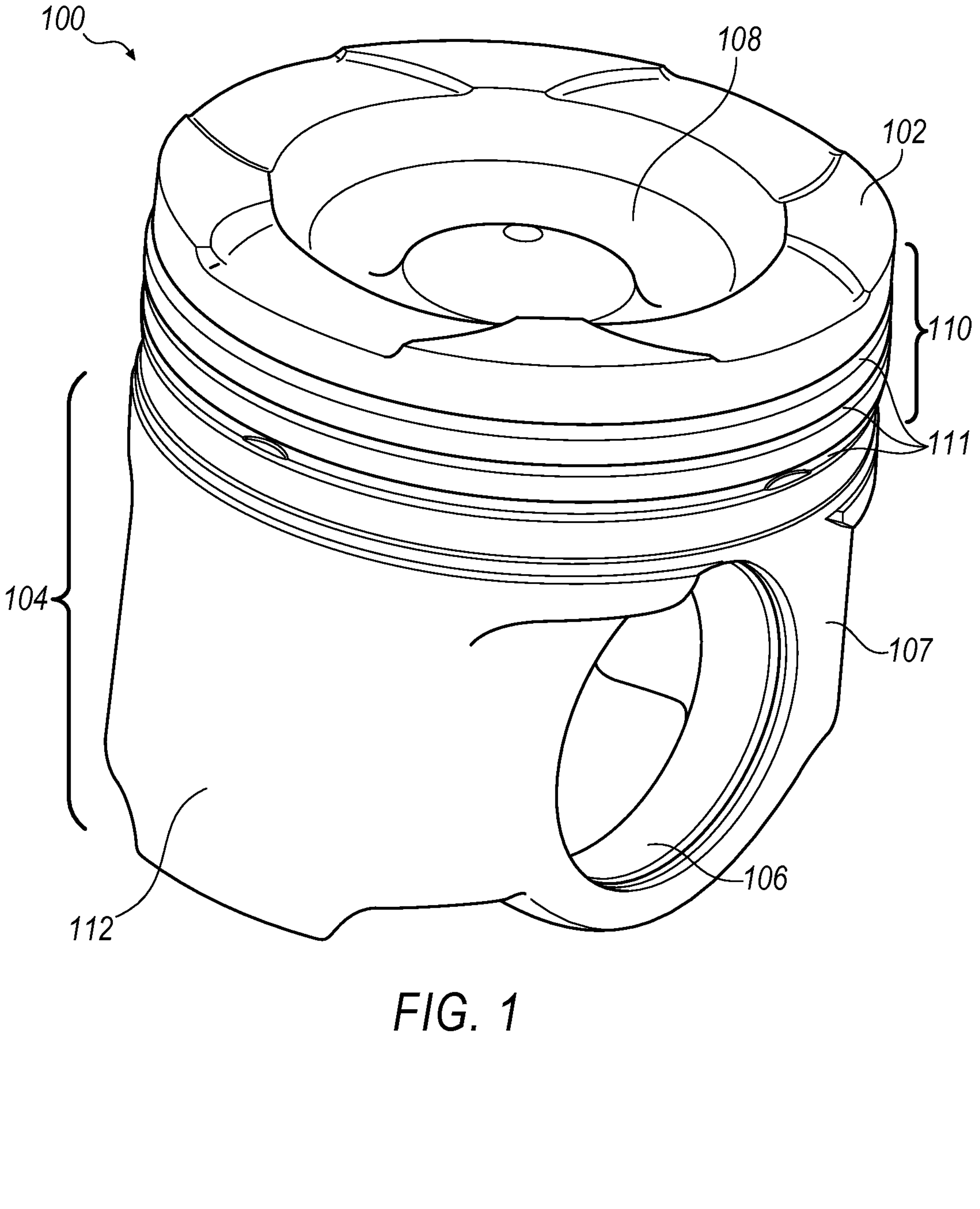
FIG. 1 is a perspective view of an exemplary piston assembly.

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of pistons and methods of making the same. An exemplary piston assembly may include a piston crown and skirt. The crown may include radially inner and outer crown mating surfaces, and the crown may define at least in part a cooling gallery extending about a periphery of the crown. The skirt may include a pair of oppositely disposed pin bosses that each define piston pin bores and cooperate to define a generally open central region configured to receive a connecting rod between the pin bosses. The skirt may further include a radially inner skirt mating surface abutted along a radially inner interface region with the radially inner crown mating surface, and a radially outer skirt mating surface abutted along a radially outer interface region with the radially outer crown mating surface such that the cooling gallery is substantially enclosed. The skirt may further include an inner collar wall disposed radially inwardly of the radially inner interface region and extending upwards to a free end. The free end may be disposed longitudinally above the radially inner mating surface of the skirt with respect to the piston assembly, thereby generally enclosing the radially inner interface region from the central region. In another exemplary illustration, the collar wall cooperates with the radially inner interface region to define an annular gallery having a lateral cross-section that is elongated longitudinally with respect to the piston.

An exemplary method of forming a piston may include providing a piston crown including radially inner and outer crown mating surfaces, the crown defining at least in part a cooling gallery extending about a periphery of the crown. The method may further include abutting the inner and outer crown mating surfaces with corresponding inner and outer skirt mating surfaces of a piston skirt. Accordingly, a radially inner interface region is formed between the inner mating surfaces, and a radially outer interface region is formed between the outer mating surfaces. Moreover, a cooling gallery may be disposed between the radially inner and outer interface regions. The skirt may include a pair of oppositely disposed pin bosses defining piston pin bores and cooperating to define a generally open central region configured to receive a connecting rod between the pin bosses. The method may further include forming a collar wall disposed radially inwardly of the radially inner interface region and extending upwards from the skirt to a free end disposed longitudinally above the radially inner mating surface of the skirt with respect to the piston assembly.

Turning now to FIG. 1, an exemplary piston assembly 100 is illustrated. Piston assembly 100 may include a piston crown 102 and a piston skirt 104. The piston crown 102 may include a combustion bowl 108 and a ring belt portion 110 that is configured to seal against an engine bore (not shown) receiving the piston assembly 100. For example, the ring belt portion 110 may define one or more circumferential grooves 111 that receive piston rings (not shown), which in turn seal against engine bore surfaces during reciprocal motion of the piston assembly 100 within the engine bore.

The piston skirt 104 generally supports the crown 102 during engine operation, e.g., by interfacing with surfaces of an engine bore (not shown) to stabilize the piston assembly 100 during reciprocal motion within the bore. For example, the skirt 104 may have an outer surface that generally defines a circular outer shape about at least a portion of a perimeter of the piston assembly 100. The outer shape may correspond to the engine bore surfaces, which may be generally cylindrical. The skirt 104 may generally slide along the bore surfaces as the piston moves reciprocally within the bore.

The skirt 104 may also include piston pin bosses 107. The piston pin bosses 107 may generally be formed with apertures 106 configured to receive a piston pin (not shown). For example, a piston pin may be inserted through the apertures in the piston pin bosses 107, thereby generally securing the skirt 104 to a connecting rod (not shown). The pin bosses 107 generally define an open area R between the pin bosses 107, e.g., for receiving the connecting rod (not shown).

Figure 2B:
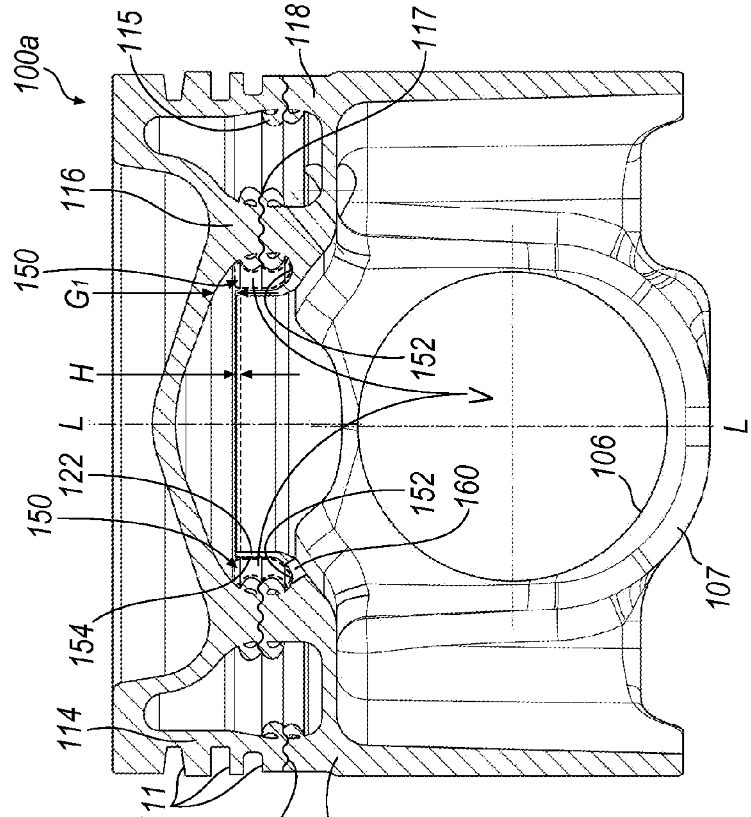
FIG. 2B illustrates a sectional view of the exemplary piston assembly of FIG. 2A, taken perpendicular to the sectional view of FIG. 2A.
Figure 2A:
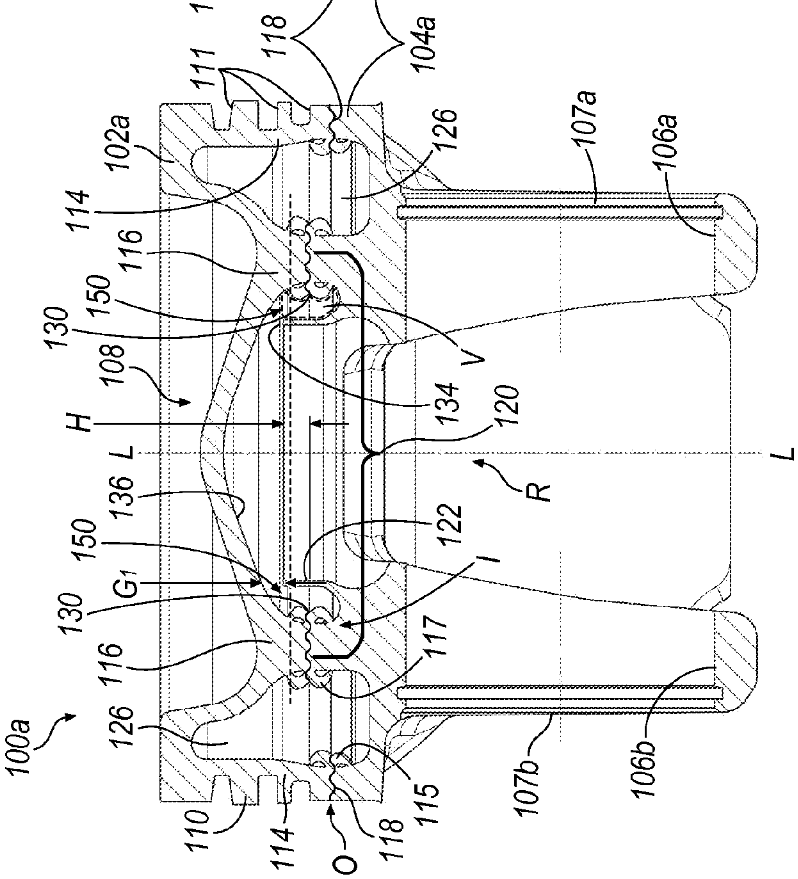
FIG. 2A illustrates a sectional view of an exemplary piston assembly, taken through the piston pin bore.

Turning now to FIGS. 2A and 2B, an exemplary piston assembly **100*a* is illustrated. The crown 102 and skirt 104 of the piston assembly 100*a* may be secured to each other in any manner that is convenient. For example, the crown 102 may define radially outer and inner mating surfaces 114, 116 that are abutted with corresponding radially outer and inner mating surfaces 118, 120 of the skirt 104. The mating surfaces 114, 116, 118, 120 may each extend about at least a portion of a circumference of the crown 102 and skirt 104, respectively. In the exemplary illustration of FIGS. 2A and 2B, the radially outer and inner crown mating surfaces 114, 116, respectively, may generally extend substantially about an entire periphery of the crown 102. Similarly, the radially outer and inner skirt mating surfaces 118, 120 also extend about substantially the entire periphery of the piston assembly 100 and/or skirt 104, and generally correspond to the crown mating surfaces 114, 116** as will be described further below.

The crown and skirt mating surfaces may cooperate to define a radially inner interface region I between the radially inner mating surfaces 116, 120, and a radially outer interface region O between the radially outer mating surfaces 114, 118. Where the crown 102 and skirt 104 are fixedly secured, the crown 102 and skirt 104 may be secured to each other via one or both of the interface regions I, O.

A circumferentially extending cooling gallery 126 may be defined in part by the ring belt portion 110 of the crown 102 and the skirt 104. For example, the exemplary illustration of FIGS. 2A and 2B includes a cooling gallery 126 that generally extends about a perimeter of the piston crown 102, and may circulate a coolant during operation, e.g., engine oil, thereby reducing an operating temperature of the piston. Additionally, the circulation of the coolant may facilitate the maintaining of a more stable or uniform temperature about the piston assembly 100, and especially in the upper portion of the piston assembly 100, e.g., the crown 102 and combustion bowl 108.

The crown 102 and skirt 104 may generally cooperate to define the cooling gallery 108 between the radially inner interface region I and the radially outer interface region O. More specifically, the skirt 104 may form a lower boundary of the cooling gallery 126, thereby enclosing the cooling gallery 126 within the crown 102, and preventing coolant from freely entering and escaping the cooling gallery 126. At the same time, one or more apertures (not shown) may also be provided to allow oil or other coolants to exit and enter the cooling gallery 126 to/from the engine (not shown) in a controlled manner, thereby further reducing and/or stabilizing operating temperatures associated with the piston 100 and components thereof.

The crown mating surfaces 114, 116 may generally define flat or planar circumferentially extending surfaces that align with the corresponding radially inner and outer mating surfaces 118, 120 of the piston skirt 104. As will be described further below, the skirt mating surfaces 118, 120 and crown mating surfaces 114, 116 may each be aligned generally parallel to the corresponding mating surface on the other component, thereby facilitating abutment of the crown mating surfaces 114, 116 with the skirt mating surfaces 118, 120, respectively.

The piston crown 102 and the piston skirt 104 may be secured or fixedly joined to one another in any manner that is convenient including, but not limited to, welding methodologies such as friction welding, beam welding, laser welding, soldering, or non-welding methodologies such as adhesive bonding, merely as examples. In one example, the piston crown and skirt are joined in a welding process, e.g., friction welding. In another exemplary illustration, one or both crown mating surfaces 114, 116 may be secured to their respective skirt mating surface 118, 120 in any manner that is convenient, e.g., by way of a welding operation such as friction welding or adhesive bonding, merely as examples, thereby securing the crown 102 and skirt 104 together.

The radially outer mating surfaces 114, 118 of the crown 102 and skirt 104, respectively, may be in abutment due to the securement of the radially inner mating surfaces 116, 120, and need not be fixedly secured. Alternatively, the radially outer mating surfaces 114, 118 may be fixedly secured, e.g., by welding, bonding, or any other manner that is convenient. Fixed securement of both pairs of the radially outer and inner mating surfaces 114, 116, 118, 120 may be desirable, for example, for particularly heavy-duty piston applications where maximum durability is desired.

By fixedly joining the piston crown 102 and the piston skirt 104, the piston assembly 100 is generally formed as a one-piece or "monobloc" assembly where the crown 102 and skirt 104 components are joined at interface regions I, O that include the radially inner mating surfaces 116, 120 and radially outer mating surfaces 114, 118, respectively. That is, the piston crown 102 is generally unitized with the piston skirt 104, such that the piston skirt 104 is immovable relative to the piston crown 102 after securement to the crown, although the crown 102 and skirt 104 are separate components.

The piston crown 102 and piston skirt 104 may be constructed from any materials that are convenient. In one exemplary illustration, the crown 102 and skirt 104 are formed of the same material, e.g., steel. In another example, the piston crown 102 may be formed of a different material than the piston skirt 104. Accordingly, a material used for the piston crown 102 may include different mechanical properties than the piston skirt 104, e.g., yield point, tensile strength, notch toughness, or thermal conductivity, merely as examples. Any material or combination may be employed for the crown 102 and skirt 104 that is convenient. Merely as examples, the crown 102 and/or skirt 104 may be formed of a steel material, cast iron, aluminum material, composite, or powdered metal material. The crown 102 and skirt 104 may also be formed in different processes, e.g., the crown 102 may be a generally single cast piece, while the skirt 104 may be forged. Any material and/or forming combination may be employed that is convenient.

In examples where the crown 102 and skirt 104 are welded together, e.g., by friction welding, one or more weld flashings 115, 117, 130 may be formed between the crown 102 and skirt 104. More specifically, weld flashings 117, 130 may be formed that extend radially outwardly and inwardly, respectively, from the radially inner interface region I. Additionally, a weld flashing 115 may be formed that extends radially inwardly from the radially outer interface region O. Another weld flashing (not shown) that extends radially outwardly from the radially outer interface region may generally be a further byproduct of a friction welding operation along the radially outer interface region O, and may be removed to form the relatively smooth outer surface of the piston assembly 100. For example, weld flashing may be removed via a machining operation.

As best seen in FIGS. 2A and 2B, the piston assembly 100 may include a generally circumferentially extending wall or inner "collar" 122 positioned radially inwardly of the radially inner interface region I. The inner collar 122 may generally obstruct or block off the radially inner interface region I and/or weld flashing 130 from a central area of the piston between pin bosses 107*a*, 107*b* of the skirt 104*a*. The inner collar thereby generally encloses the radially inner interface region I and/or weld flashing 130, forming an annular gallery 150

The inner collar 122 may define a relatively small gap $G_1$ that allows fluid communication between the annular gallery 150 and the central area R of the piston. The annular gallery 150 defines a volume V (illustrated in section in FIGS. 2A and 2B) that is generally bounded by the inner collar 122 and the radially inner interface region I, including the weld flashing 120. The inner collar 122 may bound the gallery 150 on a radially inner side and a lower side with a generally vertical wall portion 154 and a lower wall portion 152, respectively. Further, the radially inner interface region I generally bounds the gallery 150 and volume V on a radially outer side of the gallery 150, e.g., along the weld flashing 130. The gallery 150 and/or the annular volume V defined by the collar 122 and radially inner interface region I may extend about a periphery of the piston assembly 100. As best seen in FIG. 2A, the gallery 150 and/or volume V may define a lateral cross-section that is elongated with respect to a longitudinal axis L-L of the piston assembly 100*a*.

The gap $G_1$ may be sufficiently small that coolant, e.g., oil, does not accumulate within the gallery 150, which encloses the weld flash 130. One or more relatively small apertures 160 (see FIG. 2B) may be optionally provided in the inner collar 122 to permit draining of any fluids applied to the piston prior to operation, e.g., coatings or other treatments for the piston surfaces. In one exemplary illustration, the aperture 160 is no larger than approximately 5 millimeters (mm) in diameter.

In other exemplary approaches fluid retention may be desired within the gallery 150, e.g., to provide an additional cooling mechanism, so the presence of apertures, e.g., aperture 160, may be undesirable in such examples. Moreover, the gallery 150, although illustrated herein as being generally closed off from the cooling gallery 126 by the radially inner interface region I, may alternatively be provided with one or more passages (not shown) extending between the cooling gallery 126 and gallery 150 to promote coolant flow between the gallery 150 and cooling gallery 126. In any case, a byproduct of the formation of inner collar 122 including its gap $G_1$ and any aperture(s) is that access to the radially inwardly extending weld flashing 130 is unavailable within this gallery in much the same way as access to weld flashing 115 and 117 is unavailable within cooling gallery 126, e.g., for removal of the weld flash.

The inner collar 122 extends generally upward from the skirt portion 104*a*, as best seen in FIGS. 2A and 2B. The collar 122 extends upward adjacent the radially inner weld flashing 130, to an upper free end 134 that is positioned above the radially inner mating surface 120 of the skirt 104*a*, and/or the weld flashing 130. For example, in the exemplary illustration of FIGS. 2A and 2B, the free end 134 defines a height H longitudinally above, with respect to the piston assembly 100*a*, the radially inner skirt mating surface 120. The free end 134 of the lower collar defines a relatively small gap $G_1$ between a lower surface 136 of the combustion bowl 108, thereby closing off the radially inner interface region I and/or the weld flashing 130 from a central area R of the piston between the piston pin bosses 107, within which the connecting rod (not shown) may be received. In one exemplary illustration, the gap $G_1$ is no greater than approximately 1.5 millimeters (mm).

Figures 3A, 3B:
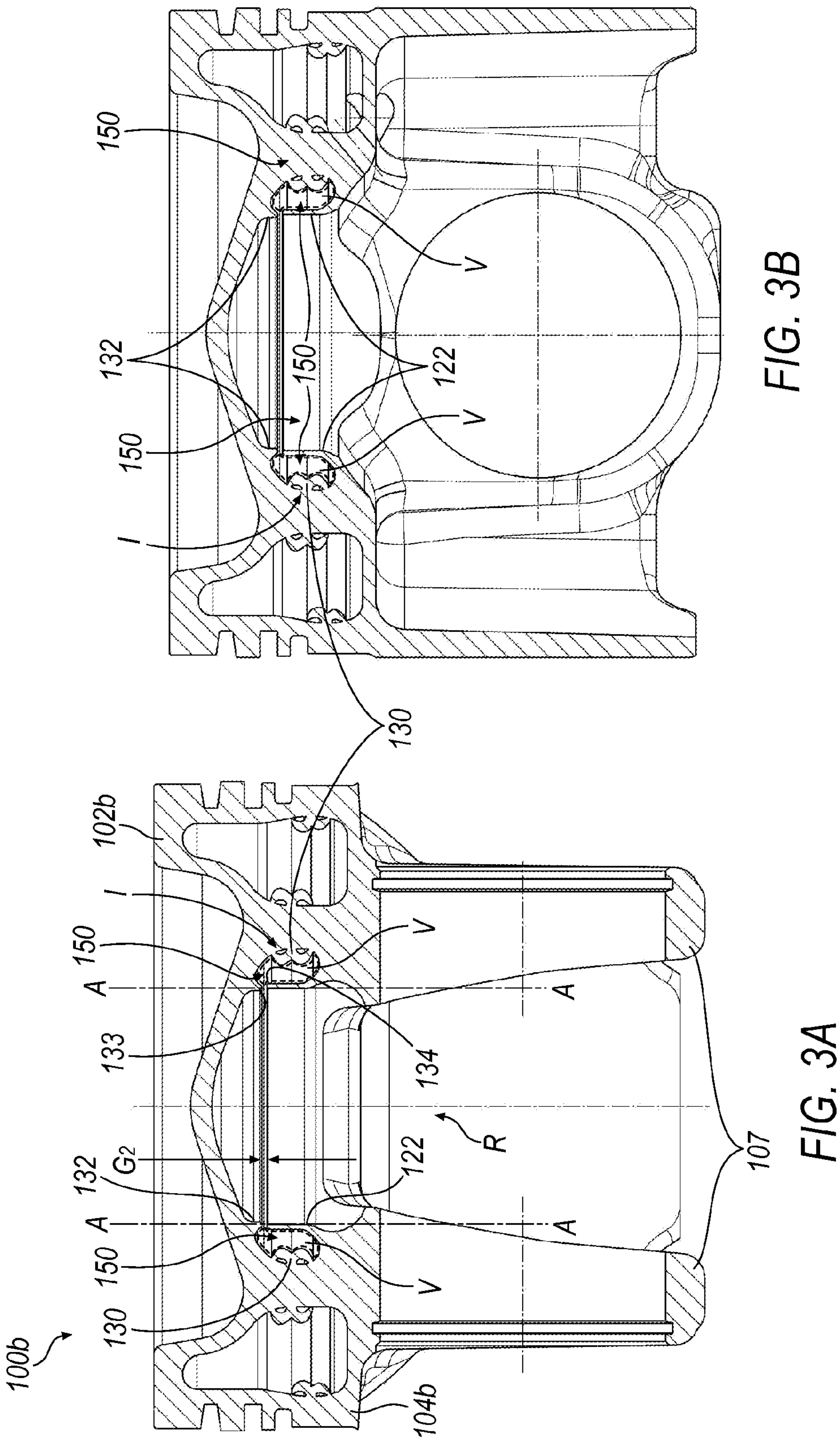
FIG. 3A illustrates a sectional view of another exemplary piston assembly, taken through the piston pin bore.
FIG. 3B illustrates a sectional view of the exemplary piston assembly of FIG. 3A, taken perpendicular to the sectional view of FIG. 3A.

Turning now to FIGS. 3A and 3B, another exemplary piston assembly 100*b* is illustrated. Piston assembly 100*b* includes a lower collar 122 extending generally vertically upwards from the skirt 104*b*. The crown 102*b* also includes an upper collar portion 132 that extends downward from the combustion bowl area to a free end 133 disposed adjacent the free end 134 of the lower collar 122. The free ends 133, 134 of the upper and lower collars 122, 132, respectively, thereby define a relatively small gap $G_2$. The upper and lower collars 122, 132 cooperate with radially inner interface region I to define an annular gallery 150. An annular volume V of the gallery 150 may be generally bounded by the radially inner interface region I along the weld flashing 130, and further by the lower collar 122 and the upper collar 132.

The gallery 150 may generally close off the radially inner weld flashing 130 from a central area R of the piston, e.g., between the pin bosses 107 in a manner similar to that discussed above with respect to FIGS. 2A and 3B. In one exemplary illustration, the gap $G_2$ between the free ends 133, 134 of the upper and lower collars 122, 132 is no greater than approximately 1.5 millimeters. Moreover, the free ends 133, 134 of the upper and lower collars 122, 132 may be generally aligned longitudinally with respect to the piston assembly 100, e.g., along axes A-A that are parallel to a longitudinal axis of the piston assembly 100. The gap $G_2$ may thereby be generally defined along the axis A-A, between the longitudinally aligned free ends 133, 134 of the upper and lower collars 132, 122, respectively.

Upper collar 132 may be employed, for example, where an upward vertical extent of the lower collar 122 is less than desired, e.g., for larger compression height piston designs. The upper collar 132 may have a relatively short vertical extent, as illustrated in FIGS. 3A and 3B.

Figure 4:
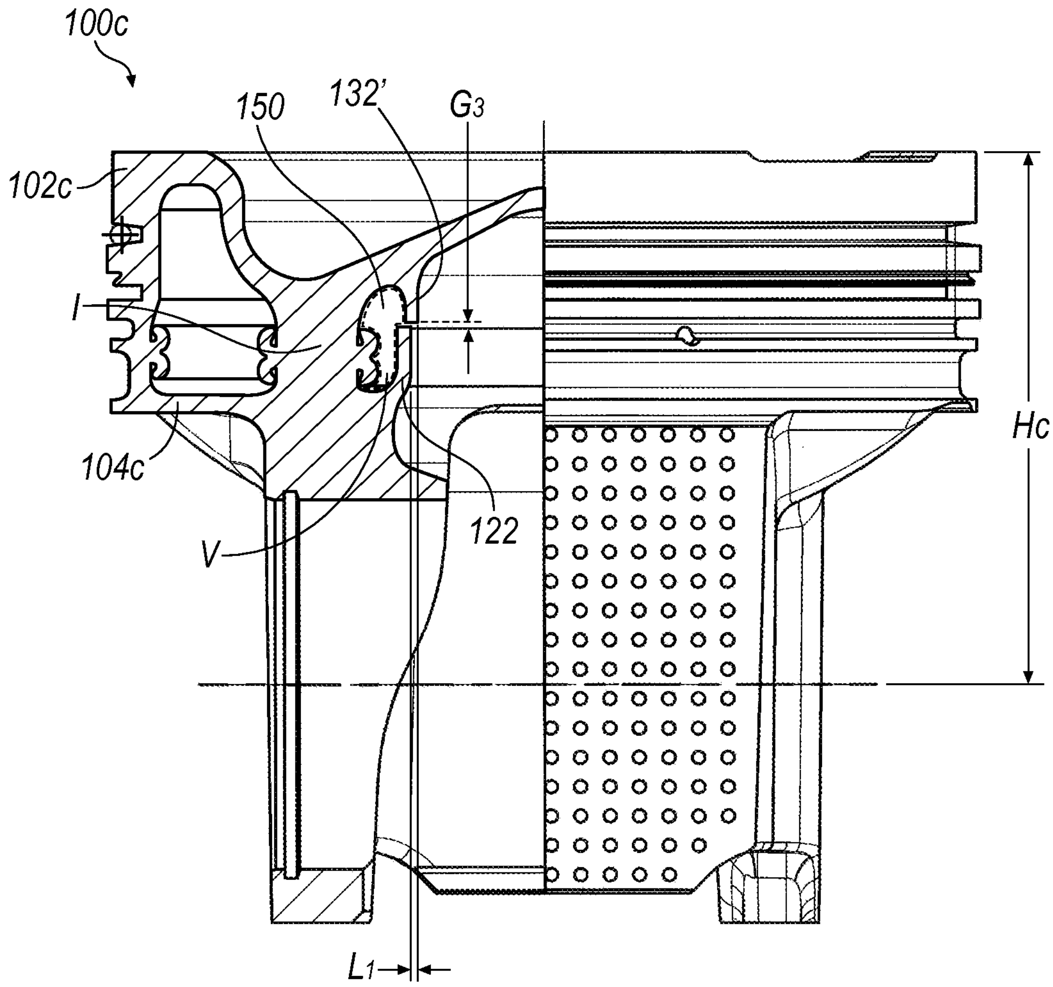
FIG. 4 illustrates a sectional view of an exemplary piston assembly, taken through the piston pin bore.

Alternatively, as illustrated in FIG. 4 an upper collar 132' may have a greater vertical extent. In the exemplary illustration of FIG. 4, the piston assembly 100*c* includes a crown 102*c*, from which the upper collar portion 132' extends downward. The upper and lower collars 122, 132' may define a circumferentially extending gap $G_3$ therebetween. The upper and lower collars 122, 132' cooperate with the radially inner interface region I to define an annular gallery 150 having a volume V. In some cases, e.g., where a compression height $H_C$ of the piston assembly 100*c* (i.e., distance from a piston top surface to centerline of the pin bore 106) is relatively large, it may be difficult to form the lower collar 122 with a sufficient upward vertical extent. Accordingly, upper collar portion 132' may be employed to maintain a relatively small gap $G_3$. In one exemplary illustration, the gap $G_3$ is approximately 1.5 millimeters. Moreover, in some approaches, upper collar 132' may be slightly laterally offset from lower collar 122 by a dimension $L_1$. In the illustrative example, however, a portion of each free end 133, 134 of a respective collar overlap such that only gap $G_3$ exists. In other words, in the exemplary illustration shown in FIG. 4, there is no corresponding lateral gap between the upper and lower collars 122, 132' in a direction generally perpendicular to the longitudinal gap $G_3$.

Figure 5B:
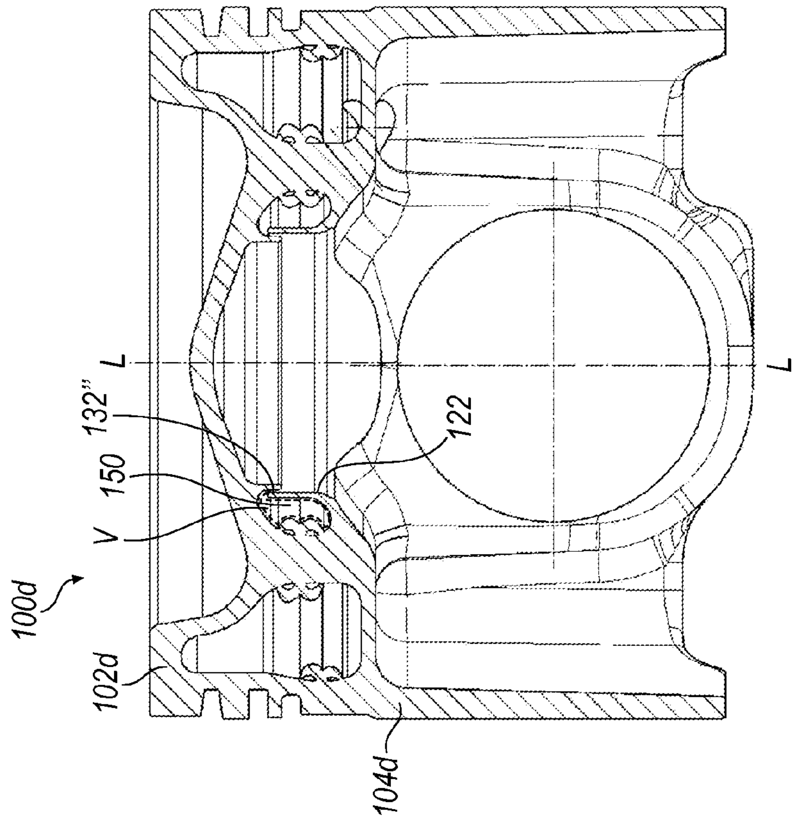
FIG. 5B illustrates a sectional view of the exemplary piston assembly of FIG. 5A, taken perpendicular to the sectional view of FIG. 5A.
Figure 5A:
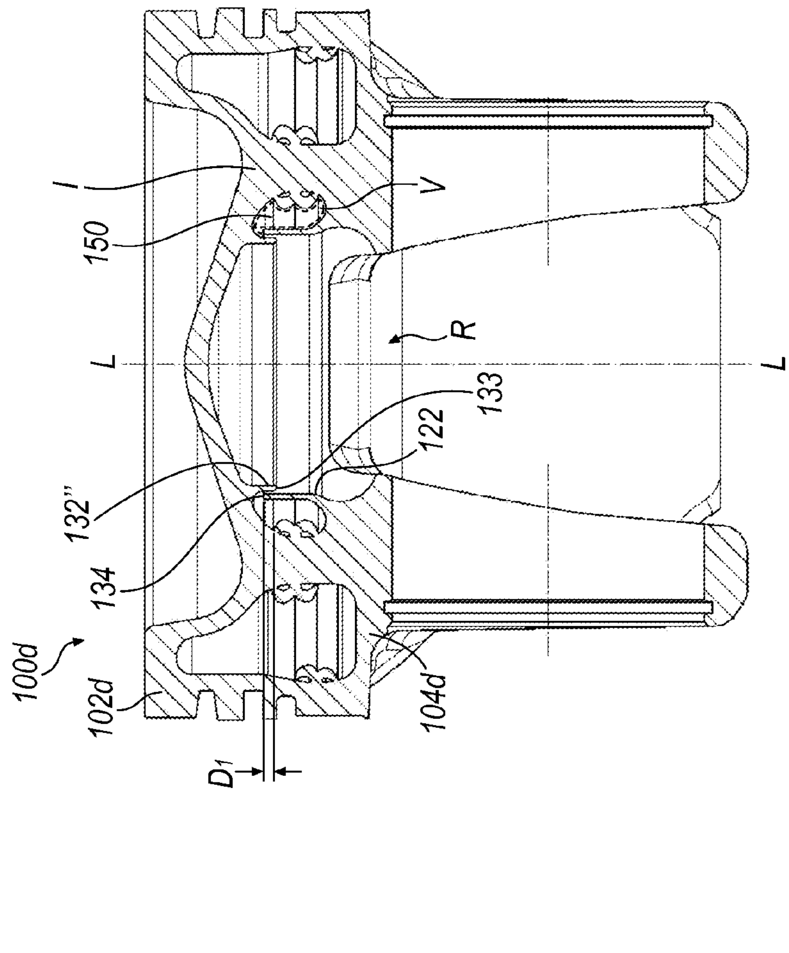
FIG. 5A illustrates a sectional view of another exemplary piston assembly, taken through the piston pin bore.

Turning now to FIGS. 5A and 5B, another exemplary piston assembly 100*d* is illustrated. The crown 102*d* of the piston assembly 100*d* includes an upper collar 132" and a lower collar 122. In the exemplary illustration shown in FIGS. 5A, and 5B, the upper and lower collars 122, 132" overlap vertically, i.e., with respect to a longitudinal axis L-L of the piston. In other words, the free end 133 of the upper collar 132" extends downward past the free end 134 of the lower collar 122, thereby defining an overlap distance $D_1$. The two corresponding mating surfaces defined within overlap distance $D_1$ are shown either abutting or in very close proximity to one another subject to manufacturing tolerances. Thus, there is no gap between the two mating surfaces. The upper collar 132" cooperates with the lower collar 122 to form an annular gallery 150. A volume V of the gallery 150 may be generally bounded by the upper and lower collars 132", 122 as well as the radially inner interface region I.

Figure 6:
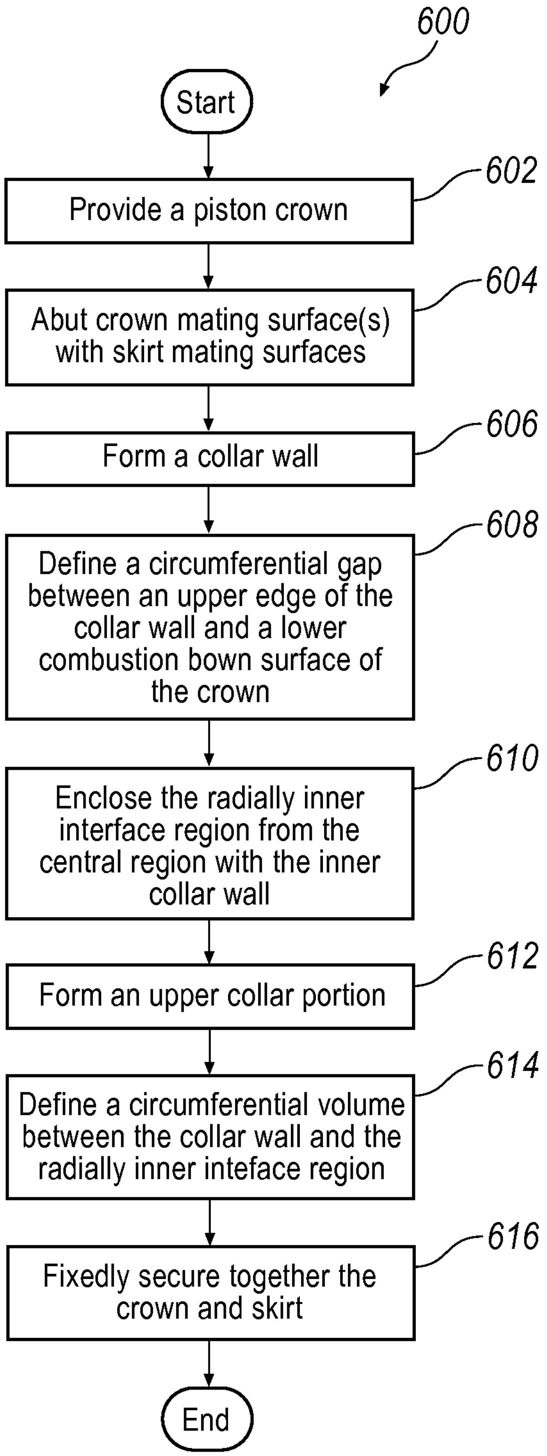
FIG. 6 is a process flow diagram of an exemplary method of making a piston assembly.

Turning now to FIG. 6, an exemplary process 600 for making a piston assembly is illustrated. Process 600 may generally begin at block 602, where a piston crown is provided. For example, as described above a crown 102 may include radially inner and outer crown mating surfaces 114, 116. Additionally, the crown 102 may define at least in part a cooling gallery 126 extending about a periphery of the crown 102. Process 600 may then proceed to block 604.

At block 604, inner and outer crown mating surfaces may be abutted with corresponding inner and outer skirt mating surfaces of a piston skirt. For example, as described above a radially inner interface region I may be formed between the inner mating surfaces 116, 120, and a radially outer interface region O may be formed between outer mating surfaces 114, 118 of the piston assembly 100. Moreover, a cooling gallery 126 may be disposed between the radially inner and outer interface regions I, O. Additionally, the skirt 104 may include a pair of oppositely disposed pin bosses 107 defining respective piston pin bores 106. The pin bosses may cooperate to define a generally open central region R configured to receive a connecting rod between the pin bosses 107.

Proceeding to block 606, a collar wall may be formed. For example, as described above, various exemplary illustrations of a collar wall 122 may be disposed radially inwardly of the radially inner interface region I, extending upward from the skirt 104 to a free end 134. In one exemplary illustration, the free end 134 is disposed longitudinally above the radially inner mating surface 120 of the skirt 104 with respect to the piston assembly 100. Process 600 may then proceed to block 608.

At block 608, a circumferential gap may be defined between an upper edge of the collar wall and a lower combustion bowl surface of the crown. For example, a gap $G_1$ may be formed between an upper edge 134 of collar wall 122 and the lower surface 136 of the combustion bowl 108.

Proceeding to block 610, a radially inner interface region may be generally enclosed from the central region with the inner collar wall. For example, as described above, a radially inner interface region I may be enclosed by the collar wall 122 with respect to a region R defined between the pin bosses 107. Process 600 may then proceed to block 612.

At block 612, an upper collar wall portion may be formed. For example, an upper collar wall 132, 132', 132" may be formed that extends downward from the crown 102 to an upper free end 133. The upper free end 133 may cooperate with the lower portion 122 to define a circumferential gap $G_2$, $G_3$.

Proceeding to block 614, a circumferential volume may be defined in part by the collar wall. For example, as described above the collar wall 122 and the radially inner interface region I may define an annular or circumferential volume V defining a lateral cross-section that is elongated longitudinally with respect to the piston 100. Process 600 may then proceed to block 616.

At block 616, the crown and skirt may be fixedly secured together along one or more of the radially inner and outer interface regions. For example, as described above the crown and skirt may be fixedly secured together along the radially inner and/or outer mating surfaces of the crown and skirt by friction welding, adhesive bonding, or any other method that is convenient. In examples where friction welding is employed, welding flash may be formed adjacent the mating surfaces 114, 116, 118, 120, as illustrated above. In one exemplary illustration, a weld flash 117 extending radially inwardly from the radially inner interface region I is disposed longitudinally with respect to the piston 100 beneath a free end 134 of the collar wall 122. Accordingly, the weld flashing 117 may be substantially enclosed by the collar wall 122.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston, comprising:

a piston crown including radially inner and outer crown mating surfaces, the crown defining at least in part a cooling gallery extending about a periphery of the crown;

a piston skirt, including:

a pair of oppositely disposed pin bosses, the pin bosses each defining piston pin bores and cooperating to define a generally open central region configured to receive a connecting rod between the pin bosses;

a radially inner skirt mating surface abutted along a radially inner interface region with the radially inner crown mating surface;

a radially outer skirt mating surface abutted along a radially outer interface region with the radially outer crown mating surface such that the cooling gallery is substantially enclosed; and an inner collar wall disposed radially inwardly of the radially inner interface region, the inner collar wall extending annularly about the generally open central region and extending upwards to a free end disposed longitudinally above the radially inner mating surface of the skirt with respect to the piston assembly, thereby generally enclosing the radially inner interface region from the central region;

wherein the collar wall cooperates with the radially inner interface region to define an annular gallery;

wherein the annular gallery defines a cross-section elongated longitudinally with respect to the piston.

2. The piston of claim 1, wherein the inner collar wall includes a lower portion defined by the skirt, and an upper portion defined by the crown, the upper portion extending annularly about the generally open central region.

3. The piston of claim 2, wherein the upper portion extends downward to an upper free end that cooperates with the lower portion to define a circumferential gap.

4. The piston of claim 3, wherein the upper portion is laterally aligned with the lower portion, such that the circumferential gap extends substantially longitudinally with respect to the piston.

5. The piston of claim 3, wherein the upper portion is laterally offset with respect to the lower portion.

6. The piston of claim 5, wherein the upper portion partially overlaps the lower portion, such that the circumferential gap extends substantially longitudinally with respect to the piston.

7. The piston of claim 1, wherein the collar wall defines a circumferential gap between an upper edge of the collar wall and a lower combustion bowl surface.

8. The piston of claim 7, wherein the gap is no greater than approximately 1.5 millimeters.

9. The piston of claim 1, wherein the crown and skirt are friction welded together along at least one of the radially inner and outer mating surfaces of the crown and skirt.

10. The piston of claim 1, wherein the radially inner skirt mating surface cooperates with the radially inner crown mating surface to separate the cooling gallery from the annular gallery, thereby preventing fluid communication between the annular gallery and the cooling gallery through the radially inner interface region.

11. The piston of claim 1, wherein the inner collar wall defines a radially outer border of the generally open central region.

12. The piston of claim 1, wherein the inner collar wall is interposed between the radially inner interface region and the generally open central portion.

13. A piston, comprising:

a piston crown including radially inner and outer crown mating surfaces, the crown defining at least in part a cooling gallery extending about a periphery of the crown;

a piston skirt, including:

a pair of oppositely disposed pin bosses, the pin bosses each defining piston pin bores and cooperating to define a generally open central region configured to receive a connecting rod between the pin bosses;

a radially inner skirt mating surface abutted along a radially inner interface region with the radially inner crown mating surface;

a radially outer skirt mating surface abutted along a radially outer interface region with the radially outer crown mating surface such that the cooling gallery is substantially enclosed; and an inner collar wall disposed radially inwardly of the radially inner interface region, the inner collar wall extending annularly about the generally open central region and extending upwards to a free end, wherein the collar wall cooperates with the radially inner interface region to define an annular gallery positioned radially inwardly of the radially inner interface region, the annular gallery defined by the collar wall and the radially inner interface region;

wherein the annular gallery defines a volume having a cross-section elongated longitudinally with respect to the piston.

14. The piston of claim 13, wherein the free end is disposed longitudinally above the radially inner mating surface of the skirt with respect to the piston assembly, thereby generally enclosing the radially inner interface region from the central region.

15. The piston of claim 13, wherein the inner collar wall includes a lower portion defined by the skirt, and an upper portion defined by the crown, the upper portion extending downward to an upper free end that cooperates with the lower portion to define a circumferential gap.

16. The piston of claim 15, wherein the upper portion is laterally aligned with the lower portion, such that the circumferential gap extends substantially longitudinally with respect to the piston.

17. The piston of claim 15, wherein the upper portion is laterally offset with respect to the lower portion, the upper portion partially overlapping the lower portion such that the circumferential gap extends substantially longitudinally with respect to the piston.

18. A method, comprising:

providing a piston crown including radially inner and outer crown mating surfaces, the crown defining at least in part a cooling gallery extending about a periphery of the crown;

abutting the inner and outer crown mating surface with corresponding inner and outer skirt mating surfaces of a piston skirt to form a radially inner interface region between the inner mating surfaces, a radially outer interface region between the outer mating surfaces, and a cooling gallery disposed between the radially inner and outer interface regions, the skirt including a pair of oppositely disposed pin bosses defining piston pin bores and cooperating to define a generally open central region configured to receive a connecting rod between the pin bosses;

forming a collar wall disposed radially inwardly of the radially inner interface region, the inner collar wall extending annularly about the generally open central region and extending upwards from the skirt to a free end disposed longitudinally above the radially inner mating surface of the skirt with respect to the piston assembly; and defining an annular gallery with the collar wall, the annular gallery defining an annular volume between the collar wall and the radially inner interface region, the circumferential volume defining a lateral cross-section elongated longitudinally with respect to the piston.

19. The method of claim 18, further comprising enclosing the radially inner interface region from the central region with the inner collar wall.

20. The method of claim 18, further comprising forming an upper collar wall portion extending downward from the crown to an upper free end that cooperates with the lower portion to define a circumferential gap.

21. The method of claim 20, further comprising laterally offsetting the upper free end partially with respect to the lower portion, the upper free end thereby partially overlapping the lower portion such that the circumferential gap extends substantially longitudinally with respect to the piston.

22. The method of claim 18, further comprising defining a circumferential gap between an upper end of the collar wall and a lower combustion bowl surface of the crown.

* * * * *